United States Patent [19]

Kessler

[11] Patent Number: 5,102,555

[45] Date of Patent: * Apr. 7, 1992

[54] METHOD OF STABILIZING MANGNAESE IN AQUEOUS SYSTEMS

[75] Inventor: Stephen M. Kessler, Fairless Hills, Pa.

[73] Assignee: Betz Laboratories, Inc., Trevose, Pa.

[*] Notice: The portion of the term of this patent subsequent to Jul. 17, 2007 has been disclaimed.

[21] Appl. No.: 661,573

[22] Filed: Feb. 26, 1991

Related U.S. Application Data

[63] Continuation-in-part of Ser. No. 521,281, May 9, 1990, abandoned, which is a continuation of Ser. No. 308,172, Feb. 8, 1988, Pat. No. 4,941,979.

[51] Int. Cl.⁵ .................................................. C02F 5/10
[52] U.S. Cl. .................................... 210/697; 210/698; 210/701; 252/181
[58] Field of Search ............................... 210/697–701; 252/180, 181

[56] References Cited

U.S. PATENT DOCUMENTS

| | | | |
|---|---|---|---|
| 3,790,610 | 2/1974 | Lum et al. | 260/429 J |
| 4,452,713 | 6/1984 | Small | 252/99 |
| 4,552,665 | 11/1985 | Ralston et al. | 210/697 |
| 4,560,481 | 12/1985 | Hollander | 210/697 |
| 4,640,793 | 2/1987 | Persinski et al. | 252/82 |
| 4,759,851 | 7/1988 | Chen | 210/697 |
| 4,941,979 | 7/1990 | Kessler | 210/698 |
| 4,960,522 | 10/1990 | Amjad et al. | 210/701 |
| 4,963,267 | 10/1990 | Hoots et al. | 210/701 |

*Primary Examiner*—Peter Hruskoci
*Attorney, Agent, or Firm*—Alexander D. Ricci; Steven D. Boyd

[57] ABSTRACT

A process for stabilizing manganese ions in aqueous solutions is disclosed. The process comprises adding to an aqueous solution containing manganese ions a polymer or copolymer of unsaturated carboxylic compounds such as acrylic acid, methacrylic acid, polyacrylic acid and maleic anhydride and an orthophosphate. The ratio of polymer to orthophosphate is preferably about 2 to 1.

5 Claims, No Drawings

METHOD OF STABILIZING MANGNAESE IN AQUEOUS SYSTEMS

This is a continuation-in-part of application Ser. No. 07/521,281 filed May 9, 1990 now abandoned which is a continuation of application Ser. No. 07/308,172 filed Feb. 8, 1989 now U.S. Pat. No. 4,941,979.

FIELD OF THE INVENTION

The present invention is directed toward the stabilization of soluble manganese is chlorinated aqueous systems such as cooling water, boiler water, and gas scrubbing systems.

BACKGROUND OF THE INVENTION

The problems of foreign material deposition and corrosion and the attendant effects have troubled water systems for many years. For instance, deposits tend to form on the internal walls of various water systems such as boiler and cooling water systems and thereby materially lessen the operational efficiency of the systems.

Deposits may originate from several sources. For example, calcium carbonate, calcium sulfate, and calcium phosphate from a systems feedwater can accumulate along or around a systems metal surfaces forming scale. Also, manganese which can be found in natural waters at concentrations up to several parts per million can result in a formation of manganese deposits. Under chlorinated conditions, manganese (II) can be easily oxidized to the manganese plus 3 valence state which is extremely unstable. Brownish-black deposits of $Mn_2O_3$ form under such conditions resulting in fouling of transfer lines and heat exchanger surfaces. The oxidation to insoluble manganese dioxide under chlorinated conditions is enhanced by elevated pH as can occur through cycling in cooling towers.

Manganese occurs at significant concentrations in many well and surface waters throughout the United States and is also present in estuarine and coastal waters. Manganese is sometimes referred to as "Ohio River Varnish" due to its ubiquitous presence along that river and the hard, dark brown to black nature of its deposits.

While manganese deposition has been noted on heat transfer and non-heat transfer surfaces, all metallurgies and plastics, metallurgy can play a factor in manganese deposition. Specific stainless steel alloys, admiralty and aluminum brass have all been found to be particularly susceptible to manganese deposition and the attendant pitting of the metal.

Any waters having detectable manganese concentrations (above about 0.02 ppm) may experience manganese deposition problems. At levels higher than 0.2 parts per million, deposition is very likely. Manganese levels greater than about 1 part per million generally cause several problems and manganese levels rarely exceed 2 parts per million even in cycled water.

Manganese deposition on tubes has been identified as manganese dioxide. Typically, it appears initially as a thin, tightly adherent, brownish-black varnish which becomes thicker, rougher and more irregular if permitted to accumulate. The uniform tightly adherent nature of the deposits lends itself well to setting up oxygen or metal ion concentration cells at holidays in the deposit probably responsible for the severe pitting effects of such deposits.

In once-through type cooling systems in Japan, injection of ferrous sulfate has been credited with greatly reducing malignant impingement attack of aluminum brass caused by manganese deposition. In the U.S., on-line mechanical cleaning devices as well as off-lie cleaning are often employed. Off-line cleaning procedures can include chemical acid cleaning, hydroblasting, and metal scrapper plugs.

U.S. Pat. No. 4,552,665, Ralston et al, discloses a method of stabilizing soluble manganese ions which comprises the addition of a copolymer of an unsaturated carboxylic compound and an unsaturated sulfonic compound. The copolymer, having a weight average molecular weight of less than about 50,000 and a weight ratio from 1:20 to 20:1 inhibits the precipitation of manganese ions and disperses the manganese reaction products in aqueous solutions.

In addition, to the copolymers disclosed in U.S. Pat. No. 4,552,665. Manganese ligands are often employed in aqueous systems such as cooling systems to help maintain manganese stabilization. Of the broad class of ligands which can be used for this purpose, polyacrylic acid is known to be an effective manganese stabilizer. Water soluble phosphates such as orthophosphates are also known to possess some manganese stabilization efficiency, however, the effect of orthophosphate is slight compared to the more effective ligands.

The stabilization of manganese under conditions where deposition is a problem can require relatively high levels of ligand treatment to adequately stabilize the manganeses ions.

SUMMARY OF THE INVENTION

The present invention provides a method of stabilizing manganese in aqueous systems by the addition of relatively low levels of a stabilizer comprising a combination of orthophosphate and an effective manganese ligand. It was discovered that the combination of orthophosphate and the select manganese ligands provides effective manganese stabilization at unexpectedly low treatment levels. The manganese stabilizers of the present invention are effective under harsh conditions such as chlorination and/or when high levels of manganese are present. The manganese stabilizer of the present invention is effective at these conditions at concentrations much lower than prior art manganese stabilizers.

DETAILED DESCRIPTION OF THE INVENTION

The present inventor described that effective manganese stabilization can be achieved by employing a combination of an orthophosphate and a select manganese ligand at relatively low treatment levels. The select manganese ligand is preferably a polymer or copolymer of an unsaturated carboxylic or dicarboxylic compound such as acrylic acid, methacrylic acid, and maleic anhydride. The ratio of the ligand to orthophosphate can range from about 1:1 to about 20:1 and is preferably about 2:1.

The combination of the present invention is effective at stabilizing manganese in aqueous systems. Stabilizing is meant to include threshold inhibition, dispersion, solubilization, particle size reduction or reaction product change.

The unsaturated carboxylic acid in the combination of the present invention may comprise polyacrylic acid, polymaleic anhydride, acrylic acid, copolymers of maleic acid, diethylaminoethylmethacrylate acrylamide, and methyl acrylate as well as carboxylic and dicarboxylic acids such as phosphinocarboxylic acid, 2-phosphobutanetricarboxylic acid-1,2,4 and carboxylated polyelectrolyte. The unsaturated carboxylic acids of the present invention exhibit enhanced manganese stabilization in the presence of orthophosphate. The preferred ligands include carboxylic and dicarboxylic acids, acrylic acid/diallyl hydroxylpropyl sulfonate ether copolymers as described in U.S. Pat. No. 4,759,851 (incorporated herein by reference), acrylic acid/hydroxyethyl acrylate copolymers and polymethyacrylic acid. The most preferred ligand is a polyacrylic acid polymer.

As shown by the following examples, the select ligands of the present invention exhibit an unexpected efficacy in stabilizing manganese when used in combination with orthophosphate. This unexpected efficacy is evidenced by effective manganese stabilization by the combination at treatment levels typically less than half of that required when the individual components are employed.

EXAMPLES

The invention will now be further described with reference to a number of specific examples which are to be regarded solely as illustrative, and not as restricting the scope o the invention.

Manganese stabilization was tested in beaker type tests using a 20 part per million stock solution of Manganese II. The pH was adjusted to 5.7 by the addition of $H_2SO_4$. Oxidation of the manganese was accomplished by the addition of 0.2 milliliters of concentrated (5%) sodium hydrochlorate solution to a 100 ml aliquot of the manganese solution. Upon addition of the sodium hypochlorite solution the pH would rise to 8.1 to 8.2. In the absence of a stabilizer, most of the manganese would oxidize to form a brownish-black precipitate. Samples of the solution with the stabilizer added were obtained and filtered through a 0.2 micron filter at 30 and 60 minute intervals and analyzed for soluble manganese concentration. The amount of soluble manganese present in each filtered sample is directly proportional to the efficacy of the stabilizer being evaluated. As shown in Table I, orthophosphate at 5 parts per million exhibits some effect 30 minutes but little effect after 60 minutes. Polyacrylic acid requires a relatively high dosage, 40 parts per million active, to effectively stabilize manganese under these harshly chlorinated test conditions.

TABLE I

| Treatment | Soluble Mn, ppm | |
|---|---|---|
| (active) | 30 min | 60 min |
| 5 ppm orthophosphate | 14.8 | 6.8 |
| 1 ppm Polyacrylic Acid (PAA) | 0.0 | 0.2 |
| 2 ppm Polyacrylic Acid (PAA) | 0.0 | 0.0 |
| 5 ppm Polyacrylic Acid (PAA) | 0.2 | 0.3 |
| 10 ppm Polyacrylic Acid (PAA) | 10.8 | 2.5 |
| 15 ppm Polyacrylic Acid (PAA) | 16.9 | 9.7 |
| 20 ppm Polyacrylic Acid (PAA) | 18.7 | 15.3 |
| 40 ppm Polyacrylic Acid (PAA) | 18.5 | 18.7 |

As shown in Table II, when a polyacrylic acid ligand is used in combination with 5 parts per million orthophosphate, a treatment dosage of only about 15 parts per million active is required to provide effective manganese stabilization.

TABLE II

| Treatment | Soluble Mn, ppm | |
|---|---|---|
| (active) | 30 min | 60 min |
| 1 ppm PAA + 5 ppm Ortho-PO$_4$ | 13.0 | 4.0 |

TABLE II-continued

| Treatment | Soluble Mn, ppm | |
|---|---|---|
| (active) | 30 min | 60 min |
| 2 ppm PAA + 5 ppm Ortho-PO$_4$ | 14.3 | 7.5 |
| 5 ppm PAA + 5 ppm Ortho-PO$_4$ | 16.3 | 1.5 |
| 10 ppm PAA + 5 ppm Ortho-PO$_4$ | 18.8 | 18.8 |
| 15 ppm PAA + 5 ppm Ortho-PO$_4$ | 19.4 | 18.0 |
| 20 ppm PAA + 5 ppm Ortho-PO$_4$ | 18.0 | 19.3 |

Table III illustrates the present invention showing the manganeses stabilization of a number of ligans at 40 parts per millions active and at 15 parts per millions active (comprising 10 parts per million the ligan plus 5 parts per million orthophosphate). The data shown in Table III is a summary of the large number of ligands tested and is intended only to be representative of the scope of the present invention. Runs 1 through 5 show ligands which are within the scope of the present invention. That is, ligands which are effective stabilizers in the tests described above at both 40 parts per million active and 10 parts per million plus 5 parts per million orthophosphate. Runs 6 through 10 show ligands which do not exhibit the improvement when employed in the combination of the present invention.

TABLE III

| Run | Treatment | 40 ppm Active Soluble Mn, ppm | | 10 ppm Ligand + 5 ppm Orthophosphate | |
|---|---|---|---|---|---|
| | | 30 min | 60 min | 30 min | 60 min |
| 1 | Polymaleic Anhydride | 18.7 | 18.6 | 18.5 | 18.5 |
| 2 | Acrylic Acid/maleic acid copolymer | 18.7 | 18.5 | 19.1 | 19.2 |
| 3 | Acrylic Acid/dimethyl-amino ethylmethacrylate copolymer | 17.9 | 18.3 | 18.7 | 18.4 |
| 4 | Acrylic Acid/methyl acrylate copolymer | 17.5 | 17.3 | 15.8 | 16.0 |
| 5 | Acrylic Acid/acrylamide copolymer | 18.2 | 17.1 | 17.5 | 17.1 |
| 6 | 2-isonitrosoactophenone | 17.0 | 15.8 | 11.9 | 5.6 |
| 7 | Cupric acetylacetonate | 11.8 | 14.6 | 1.2 | 0.2 |
| 8 | Pentaethylene hexamine | 7.6 | 13.0 | 6.0 | 1.2 |
| 9 | Manganous Acetylacetonate | 11.6 | 12.3 | 4.3 | 0.7 |
| 10 | Hydroxyethylene diamine triacetate | 10.4 | 10.9 | 0.1 | 0.3 |

TABLE IV

| Treatment | Level, ppm | Soluble Mn, ppm | | % Inhibition | |
|---|---|---|---|---|---|
| | | 30 min | 60 min | 30 min | 60 min |
| Control | — | 1.6 | 0.8 | 0 | 0 |
| Orthophosphate | 1 | 5.3 | 3.2 | 14 | 8.2 |
| Polyacrylic Acid (PAA) | 20 | 16 | 13 | 52 | 42 |
| PAA + Ortho-PO$_4$ | 20/1 | 28 | 28 | 97 | 93 |

Table IV illustrates the effectiveness of the present invention at a polymer to orthophosphate ratio of 20:1. The test procedure was as described above with the exception of the stock solution of manganese II being 29 ppm. As shown in Table IV the combination of polymer and orthophosphate provides greatly improved manganese stabilization at ratios as high as 20:1 polymer to orthophosphate.

While the present invention has been described with respect to particular embodiments thereof, and with specific examples, it is apparent that numerous other forms and modifications of the invention will be obvious to those skilled in the art. The appended claims and this invention should be construed to cover all such obvious forms and modifications which are within the spirit and scope of the present invention.

What is claimed is:

1. A process for stabilizing manganese ions in an aqueous solution comprising adding to said aqueous solution containing manganese ions an effective amount for the purpose of a combination of a polymer consisting essentially of unsaturated carboxylic compounds and an orthophosphate to maintain said manganese ions soluble in said aqueous solution wherein the ratio of polymer to orthophosphate is from about 2:1 to about 20:1.

2. The process of claim 1 wherein said combination is added to the aqueous solution containing manganese ions at a concentration of from about 0.1 to about 100 ppm.

3. The process of claim 1 wherein said unsaturated carboxylic compound is selected from the group consisting of acrylic acid, methacrylic acid, and maleic anhydride.

4. A process for stabilizing manganese ions in an aqueous solution comprising adding to said aqueous solution containing manganese ions an effective amount for the purpose of a combination of polyacrylic acid and an orthophosphate to maintain said manganese ions soluble in said aqueous solution wherein the ratio of polymer to orthophosphate is from about 2:1 to about 20:1.

5. The process of claim 4 wherein said combination is added to the aqueous solution containing manganese ions at a concentration of from about 0.1 to about 100 ppm.

* * * * *